Oct. 21, 1952     J. H. BOOTH     2,614,873
BALL JOINT
Filed Oct. 30, 1948
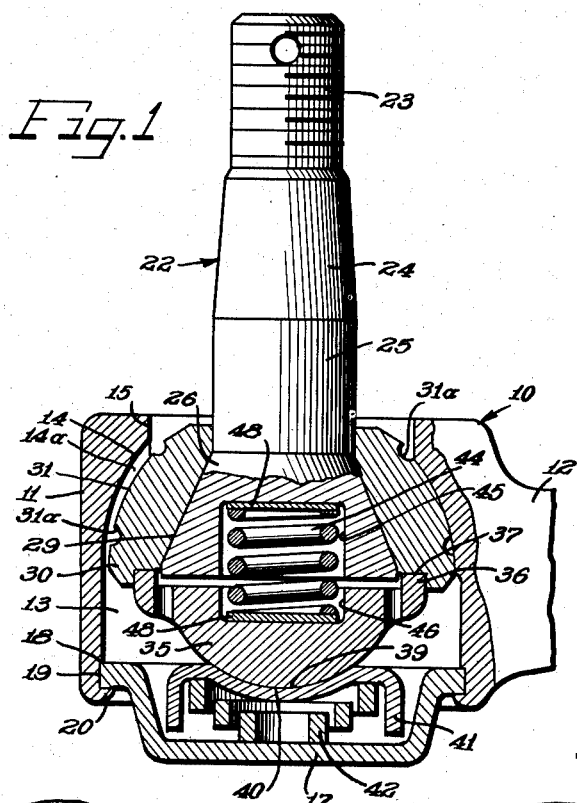
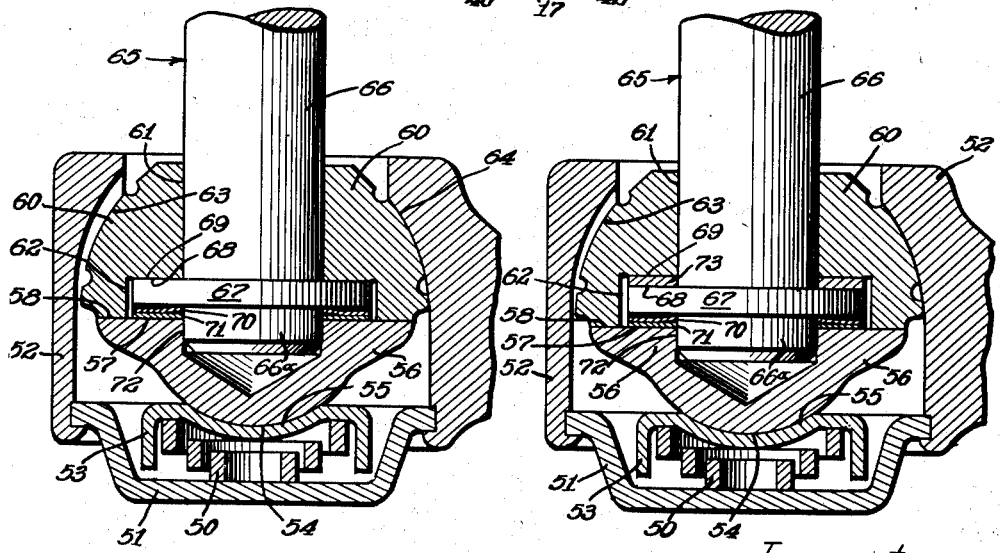
Inventor
James H. Booth Patented Oct. 21, 1952

2,614,873

UNITED STATES PATENT OFFICE 2,614,873

BALL JOINT

James H. Booth, Venice, Mich., assignor to Thompson Products, Inc., Cleveland, Ohio, a corporation of Ohio Application October 30, 1948, Serial No. 57,439

5 Claims. (Cl. 287—90)

This invention relates to a ball joint structure having dual bearing surfaces, one of which is effective to carry the bearing load due to the normal rotation of the stud and the other bearing surface providing means for tilting the stud relative to the housing, the loading on the tilting bearing surfaces being greater than that on the rotative bearing surfaces.

Specifically, the invention deals with a ball and socket tie rod joint for automotive steering assemblies wherein two independent pairs of mating bearing surfaces are provided, one pair of surfaces being loaded by a heavier spring than is the other pair, whereby the lightly loaded pair will accommodate steering action by easy rotation of the stud while the heavily loaded pair of bearing surfaces will accommodate tilting action incident to the rise and fall of the dirigible wheels.

According to this invention, a socket member or housing has an internal segmental spherical surface with an apertured end wall at one end, a cylindrical bore below the spherical bearing surface, and a counterbore in the other end thereof. A bearing ring having a segmental spherical bearing surface mating with the internal bearing surface of said housing is firmly pressed into bearing engagement by a heavily loaded spring acting through a spring seat and a pilot cap member. This pilot cap member is held in aligned relation with the bearing ring. The bearing ring has an internal bearing surface receiving in bearing engagement an end portion of a stud projecting into said housing. A relatively lightly loaded spring disposed between the stud and the pilot cap member urges the stud and ring bearing surfaces together. Thus, due to the differential in loading of the bearing surfaces, a constant resistance to the turning of the stud is provided by the loading of the lighter spring, while the heavier spring positively prevents the outer spherical bearing from turning under normal loading of the stud due to rotation thereof. The spherical bearing surfaces will be utilized only for pivoting movements of the stud and therefore excessive wear of the spherical surfaces will be prevented.

A feature of this invention resides in the use of a pilot cap member for performing the dual function of transmitting the force exerted by the heavy outer spring directly to the outer spherical bearing member and of acting as the abutment against which the lighter inner spring is bottomed.

A further feature of the present invention resides in the provision of springs of different load characteristics for automatically controlling the conditions under which the mating bearing surfaces of a ball and socket joint go into operation.

A still further feature of the present invention is to provide a tie rod joint with lightly loaded members for accommodating steering movement and heavier loaded members for accommodating wheel action.

An object of this invention is to provide a joint construction having a first pair of bearing surfaces pressed together by a first spring and a second pair of bearing surfaces pressed together by a second independently acting spring.

Another object of this invention is to provide an automotive tie rod joint having nested pairs of bearing surfaces respectively accommodating steering action and wheel action wherein each pair is separately and independently loaded.

Another object of the invention is to eliminate heretofore necessary heavy loads on the stud of a tie rod joint without eliminating wear take-up capacity of the joint.

Other and further features, advantages, and objects of the present invention will become apparent to one skilled in the art from the following detailed description of the annexed sheets of drawings.

On the drawings:

Figure 1 is a vertical cross-sectional view, with parts shown in elevation, of a joint structure according to this invention;

Figure 2 is a vertical cross-sectional view, with parts shown in elevation, of a second embodiment of the joint structure of this invention; and Figure 3 is a vertical cross-sectional view, with parts shown in elevation, of a third embodiment of the joint structure of the present invention.

As shown on the drawings:

The joint assembly 10 of this invention is composed of a housing 11 of generally cylindrical contour with a laterally extending rod-like stem or shank 12. The cylindrical housing 11 has a hollow central section defining a cavity or chamber 13 provided at one end thereof with an inner segmental spherical bearing wall 14 converging toward a reduced diameter circular opening 15. The wall 14 is grooved as at 14a to provide lubricant paths. The large end of the chamber 13 is closed by a cup or plate 17 seated against a shoulder 18 provided by a counterbore 19 within the housing wall. The plate 17 is held in position by peening or spinning the lower edges of the housing wall thereover, as indicated at 20.

A stud 22 projects through the opening 15 into the housing and has a threaded top portion 23, an intermediate tapered portion 24, a cylindrical shank 25 below the tapered portion, and a segmental conical head portion 26. The head portion 26 of the stud is disposed in bearing contact with an inner mating tapered bearing surface 29 of a bearing ring 30. This ring 30 has an external segmental spherical bearing wall 31 of substantially the same contour as that of the inner spherical bearing wall 14 of the housing 11 to mate therewith. Grease grooves 31a are provided around the wall 31 to receive grease from the grooves 14a.

A cap 35 is disposed below the head of the stud 22 having an upstanding annular ledge or flange 36 projecting into a circular recess 37 in the flat bottom of ring 30. The outer side wall of the flange 36 fits snugly against the side wall of the recess 37 to hold the cap 35 in alignment with the ring. The cap member 35 has a segmental spherical end surface 39 disposed in a mating fragmental spherical cavity 40 of a spring seat 41. A coil spring 42 between the closure plate 17 and the spring seat 41 urges the cap 35 upwardly against the spherical bearing ring 30 pressing said spherical bearing member against the bearing surface 14 of the housing. It should be noted that the strength of the spring 42 will determine the load of the spherical bearing ring 30 on the bearing wall 14 of the housing 13.

The tapered head 26 of the stud 22 is urged into bearing engagement with the inner tapered bearing surface 29 of the bearing ring 30 by a coil spring 44 disposed in aligned central cavities 45 and 46 of the stud head 26 and the cap member 35 respectively. A spring seat or wear washer 48 is positioned between the ends of the spring and the base of each cavity. Thus the spring 44, bottomed on the cap member 35, urges the tapered bearing 29 against its mating bearing surface and the turning effort on the stud can, therefore, be regulated by choosing a spring of the desired load rate.

It is contemplated in this invention to use a heavily loaded outer spring 42 and a relatively lightly loaded inner coil spring 44. The heavily loaded spring will then, under normal load, resist rotation of the spherical bearing ring 30. The stud, however, seating against the bearing ring 30 on its inner tapered surface 29, is urged against that surface by the relatively lightly loaded inner coil spring. Therefore, the spherical bearing ring will not rotate when under normal load, but, because the inner spring operates independently, it will permit the stud to rotate in the ring 30 under influence of a low turning load. Since, in an automotive steering assembly, the tie rod joint accommodates steering action by rotation of its stud and accommodates wheel action by tilting of its stud, the joint of this invention will not interfere with easy steering, but will, nevertheless, take up wear to remain tight for accurately transmitting the steering action to the wheels.

In Figure 2, there is illustrated a second embodiment of the joint assembly of the present invention. In this form, a spring 50 bottomed against a joint closure plate 51 of a housing 52 acts against a spring seat 53 to urge a concave bearing surface 54 of the seat 53 into bearing contact with a convex fragmental spherical bearing surface 55 of a cap member 56. The cap member 56 has a flat contact surface 57 in a plane substantially normal to its axis, which surface is in abutting contact with a flat annular contact surface 58 of a bearing ring 60.

The bearing ring 60 has a central cylindrical bore 61, terminating at one end in an enlarged cylindrical recess 62. An outer segmental spherical bearing wall 63 on the ring 60 is in bearing engagement with a mating segmental spherical bearing wall 64 of the housing 52. Thus, as in the joint assembly of Figure 1, the relatively heavy spring 50, through the spring seat 53 and the cap 56, urges the bearing ring 60 into bearing engagement with the spherical bearing surface of the housing 52.

A stud 65 is disposed in the housing 52 having a straight cylindrical shank 66 in the bore 61 and a head 67 in the recess 62. The head is in the form of a flat circular disk and provides a shoulder or ledge 68. The ledge 68 contacts the bottom wall 69 of the recess 62. A dished spring washer 70, disposed between the head 67 and a spring seat or wear plate 71 which rests on the flat surface 57 of the cap 56, presses the ledge 68 against the wall 69 of the recess 62. A cylindrical shank portion 66a of the stud 65 projects below the head 67 into a cylindrical well or recess 72 in the cap 56 to hold the cap in alignment with the ring 60.

Therefore, in the embodiment of Figure 2, there is provided an outer coil spring 50 which may be heavily loaded to urge the bearing ring 60 onto its seat in the housing and an inner relatively lightly loaded spring washer 70 which urges the head portion of the stud into bearing engagement with a bearing surface 69 of the bearing member 60. As in Figure 1, this second arrangement of joint structure provides means for exerting a constant turning load on the stud and also a heavily loaded bearing surface for accommodating tilting movement of the stud.

In Figure 3 is shown a further modification of the joint structure of the present invention. This structure is identical to that of Figure 2 with the exception that a bearing member 73 is disposed between the upper surface of the ledge 68 of the stud and the bottom wall 69 of the cylindrical recess 62 of the bearing member 60. This bearing member may take the form of a spring washer as illustrated in Figure 2, or some other form of bearing which will give the desired frictional characteristics between the surfaces.

From the above descriptions it will be understood that this invention provides for the individual and independent loading of the separate sets of bearing surfaces in a joint which accommodates tilting and rotating movements.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint structure comprising a housing having a central cavity with apertured end portions and an inner segmental spherical bearing surface adjacent one end portion, a closure plate anchored across the other apertured end portion, a bearing ring having an outer bearing surface mating with the inner bearing surface of said housing and having a central cavity defining a segmental conical bearing surface terminating at one end in an enlarged diameter opening providing a shoulder, a pilot member having a circular flange portion seated in the enlarged opening of said bearing ring against said shoulder and having a segmental spherical bearing portion, a spring seat having a dished portion receiving the spherical bearing portion of said pilot member, a spring between said closure plate and said spring seat for urging said pilot member against said bearing ring to seat the bearing ring on the segmental bearing surface of said housing, a stud extending into the housing having a segmental conical head portion in bearing engagement with the inner conical bearing surface of said bearing ring, said stud and said pilot member having opposed recessed portions, a coil spring in said recessed portions, and thrust washers between the bottom of said recesses and the ends of said spring, said coil spring being effective to urge the conical surface of said stud against the conical surface of said bearing member.

2. A joint structure comprising a housing having a central cavity with an aperture at one end thereof and an inner bearing surface, a bearing ring disposed in said cavity and having an outer bearing surface, a rigid pressure transmitting member engaging said ring, a first spring acting on said member and urging the outer bearing surface of said ring into bearing engagement with the bearing surface of said housing, said bearing ring having a central cavity defining an inner bearing surface, a stud projecting into said housing and having a head portion with a bearing surface, a second spring urging said bearing surface of the stud against the inner bearing surface of said bearing ring, said springs being arranged in tandem with said first spring being more heavily loaded and acting as a support for said second spring, whereby the mating bearing surfaces of said housing and said bearing ring are subjected to a greater spring loading than the mating bearing surface of said bearing ring and said stud.

3. A joint structure comprising a housing having a central cavity with an inner bearing surface, a bearing ring disposed in said cavity having an outer bearing surface mating with the bearing surface of said housing, a first spring urging said bearing ring against said housing, said bearing ring also having an inner bearing surface, a stud with a head portion defining a bearing surface, a second spring urging the bearing surface of said stud against the inner bearing surface of said bearing ring, a rigid element between said springs and abutting said bearing ring to transmit the bias of said first spring thereto, said second spring acting independently of said first spring and opposing the bias on said rigid element, said first spring being loaded greater than said second spring, whereby the mating bearing surfaces of said housing and said bearing ring will remain stationary during rotation of said stud but will accommodate tilting of the stud.

4. A joint structure comprising a housing having an inner segmental spherical bearing surface, a bearing ring tiltable on said spherical surface and having a central aperture defining an inner segmental conical bearing surface, a stud having a head rotatable on said conical bearing surface, a rigid pilot member tiltable about the same center as said bearing ring and spring pressed thereagainst, and a spring opposing the spring bias on said pilot member and urging said stud head against the conical surface of said ring, the bias of said spring being less than the spring bias pressing said pilot against said bearing ring.

5. A tie rod joint having separately loaded bearing members to accommodate steering action and wheel action in an automotive steering linkage, which comprises a housing having a bearing wall accommodating tilting movements, a seat in said housing in tilting engagement with said bearing wall, a stud extending through said seat in rotatable relation therewith, a rigid cap member bottomed on said seat and tiltable therewith, a relatively heavily loaded spring acting on said cap to urge the seat against the housing bearing wall, and a relatively lightly loaded spring between the cap and the stud urging the stud against the seat and opposing the bias of the heavily loaded spring on the cap, whereby rotation of the stud in the seat to accommodate the steering action will be under the influence of the lightly loaded spring while tilting of the stud and seat in the housing will be under the influence of the heavily loaded spring.

JAMES H. BOOTH.

REFERENCES CITED

The following references are of record in the file of this patent:

UNITED STATES PATENTS

| Number | Name | Date |
|---|---|---|
| 2,147,815 | Hufferd et al. | Feb. 21, 1939 |
| 2,396,137 | Venditty et al. | Mar. 5, 1946 |